(12) United States Patent
Hartman et al.

(10) Patent No.: US 7,566,979 B1
(45) Date of Patent: Jul. 28, 2009

(54) ELECTRICAL POWER SOURCE

(75) Inventors: Albert Hartman, Palo Alto, CA (US);
Benjamin Huang, Palo Alto, CA (US);
William Akin, Morgan Hill, CA (US);
John Masles, San Jose, CA (US); Joe Tomasic, San Jose, CA (US); Wendy Lorimer, Ann Arbor, MI (US)

(73) Assignee: High Tide Associates, Inc., Palo Alto, CA (US)

( * ) Notice: Subject to any disclaimer, the term of this patent is extended or adjusted under 35 U.S.C. 154(b) by 461 days.

(21) Appl. No.: 11/552,855

(22) Filed: Oct. 25, 2006

Related U.S. Application Data

(60) Provisional application No. 60/730,242, filed on Oct. 25, 2005.

(51) Int. Cl.
*H02K 7/18* (2006.01)
(52) U.S. Cl. .................. 290/1 R; 290/54; 290/40 C
(58) Field of Classification Search .................. 290/1 R, 290/40 C, 54
See application file for complete search history.

(56) References Cited

U.S. PATENT DOCUMENTS

| | | | |
|---|---|---|---|
| 6,201,314 B1 | 3/2001 | Landry | |
| 6,472,846 B1 | 10/2002 | Hutchinson et al. | |
| 6,643,158 B2 | 11/2003 | McDonald et al. | |
| 6,849,960 B2 | 2/2005 | Hartman et al. | |
| 6,914,340 B2 | 7/2005 | Becker et al. | |
| 6,930,403 B2 * | 8/2005 | Hartman et al. | 290/1 A |
| 6,943,459 B2 | 9/2005 | Hartman et al. | |
| 7,049,708 B2 | 5/2006 | Hartman et al. | |
| 7,239,031 B2 * | 7/2007 | Ricketts | 290/1 R |

FOREIGN PATENT DOCUMENTS

GB 2400753 10/2004

* cited by examiner

*Primary Examiner*—Nicholas Ponomarenko
*Assistant Examiner*—Iraj A Mohandesi
(74) *Attorney, Agent, or Firm*—Roeder & Broder LLP

(57) ABSTRACT

A power source that is powered by a user to generate electrical energy includes a generator assembly and a fluid source. The generator assembly includes a rotor, a stator, and a fluid driven motor that is coupled to the rotor. Movement of the rotor relative to the stator results in the generation of electrical energy. The fluid source is manually powered by the user to direct pressurized fluid to the fluid driven motor to move the rotor relative to the stator. The fluid source can include a first fluid pump that is powered by the user to generate the pressurized fluid and a second fluid pump that is powered by the user to generate the pressurized fluid. One or both of the fluid pumps can include a fluid bellows that is powered by the user to generate the pressurized fluid. Alternatively, one or both of the fluid pumps can include a cylinder and a piston that is moved within the cylinder by the user to generate the pressurized fluid.

21 Claims, 6 Drawing Sheets

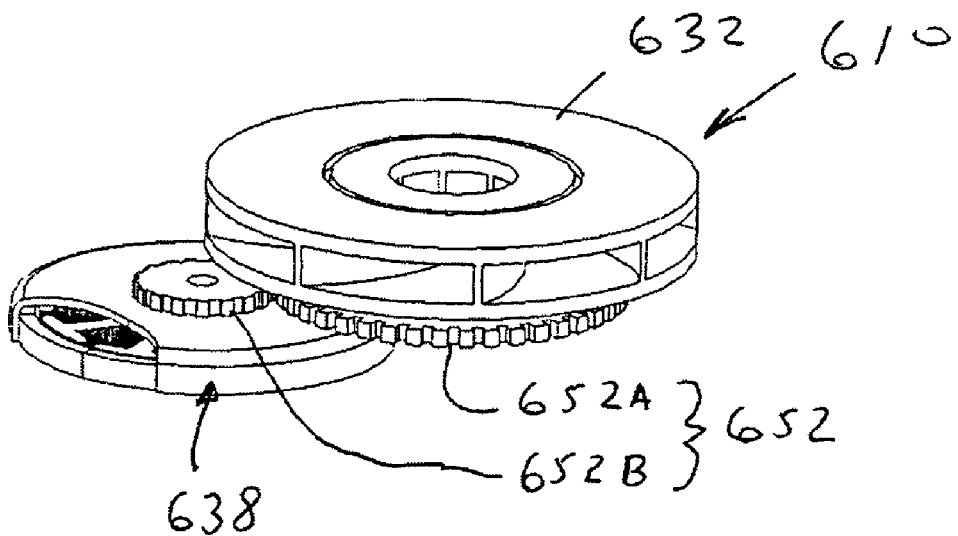
F.G. 6
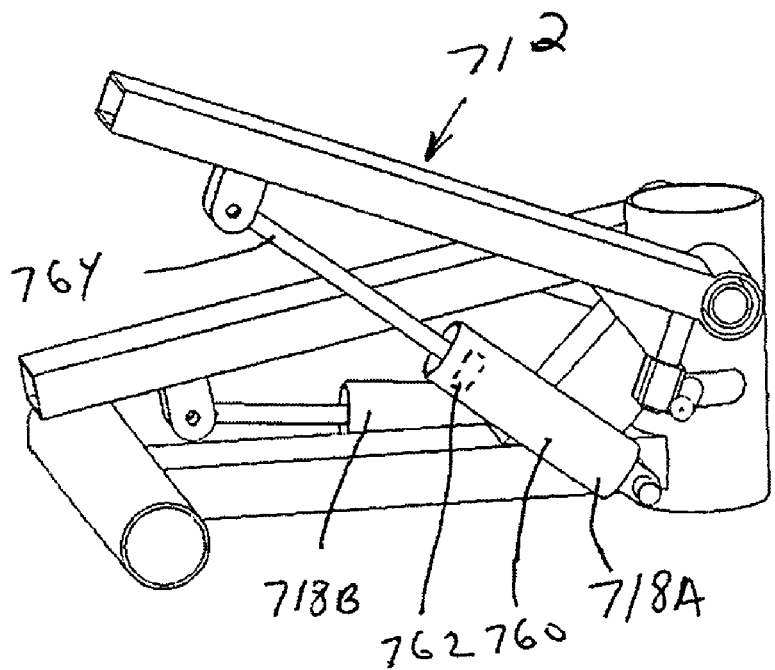
F.G. 7

ELECTRICAL POWER SOURCE

RELATED APPLICATION

This application claims priority on Provisional Application Ser. No. 60/730,242 filed on Oct. 25, 2005 and entitled "ELECTRICAL POWER SOURCE". As far as is permitted, the contents of Provisional Application Ser. No. 60/730,242 are incorporated herein by reference.

BACKGROUND

Portable electronic devices are used for a variety of useful functions, including (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Further, many more such types of devices are being created all the time. In some cases, the new electronic devices have become critically important to public safety such as 911 emergency service on mobile telephones, or global position satellite devices for general aviation and marine use.

One common element in all these portable electronic devices is their need for portable electrical power. This has been traditionally solved by using assemblies of chemical batteries, either the one-time use disposable batteries (such as alkaline, zinc-air), or the multiple use rechargeable batteries (such as nickel-cadmium, nickel-metal-hydride, lead-acid, lithium-ion).

Rechargeable batteries must be near a power source to be recharged, typically, a source of 60 Hz/120V. This is generally not available in remote locations. This has made the use of field dynamo-style generators practical. Dynamo style power generators have a long history of usage. However, these generators are bulky, heavy, lowpower, single voltage, single device, fatiguing to operate, inefficient, no feedback, and/or dangerous to batteries.

The design of manually-driven dynamo generators is made difficult by the nature of the human input forces placed on the device. Humans are typically high force/low speed. But dynamos work best at low force/high speed. In hand driven dynamos, cranking forces can range up to 30 pounds. In leg driven dynamos, these forces can range up to 200 pounds. These high forces necessitate rugged, heavy mechanics. Human operating speeds are generally low at 2-3 Hz (ex: cranking revolutions per second or leg steps per second). So, in order to spin the dynamos at higher speeds, a high ratio step-up transmission needs to be included between the input motions and the spinning dynamo.

Dynamos should be operated at higher speeds to produce adequate power. In a permanent magnet dynamos such as brushless DC generators (BLDC), output power P is proportional to the dynamo spinning speed $\omega$ squared, or: $P\alpha\omega^2$. To convert the slow input speed of the human forces to the higher speeds desired by dynamos, a step-up transmission is employed. These speed-increaser transmissions are typically single or multi-stage gear trains or belts. These transmissions are generally complicated and expensive to make because of the combined requirements for high step-up ratio, ruggedness, low friction, low acoustic noise and frequently unidirectional rotation. And consequently these transmissions are bulky, heavy and expensive.

Human-powered dynamos also operate at continually varying speeds because of the non-uniform nature of human motions. This results in constantly varying speed rotors in the dynamo that produce varying voltages and currents. However, batteries being charged or electronics being operated require carefully controlled voltages and currents. Additionally, the amount of resistance felt by the user during operation has a strong affect on how quickly the user fatigues. This resistance is also a function of the produced voltages and currents. Therefore, an electronic power control system needs to be included.

In light of the above, there is the need for an efficient portable device to produce electrical energy in the field. Additionally, there is a need for a power source that can be used to generate output current and voltages to a wide range of different electronic devices with their various battery chemistries and power needs. Moreover, there is a need for a power source that is relatively easy and efficient to use and control. Further, there is a need for a power source that reduces user fatigue. And further, there is a need for a power source that achieves high dynamo spinning speeds while remaining rugged and lightweight.

SUMMARY

The present invention is directed to power source that is powered by a user to generate electrical energy. The power source includes a generator assembly and a fluid source. The generator assembly includes a rotor, a stator, and a fluid driven motor that is coupled to the rotor. Movement of the rotor relative to the stator results in the generation of electrical energy. The fluid source is manually powered by the user to direct pressurized fluid to the fluid driven motor to move the rotor relative to the stator. With this design, in certain embodiments, the present invention provides a relatively lightweight and efficient manually powered generator.

In one embodiment, the fluid source includes a first fluid pump that is powered by the user to generate the pressurized fluid and/or a second fluid pump that is powered by the user to generate the pressurized fluid. One or both of the fluid pumps can include a fluid bellows that is powered by the user to generate the pressurized fluid. Alternatively, one or both of the fluid pumps can include a cylinder and a piston that is moved within the cylinder by the user to generate the pressurized fluid.

As provided herein, the fluid driven motor can include an impeller that is rotated by the pressurized fluid. The impeller can be directly connected to the rotor so that rotation of the impeller results in rotation of the rotor. Alternatively, a transmission assembly can connect the impeller to the rotor so that rotation of the impeller results in rotation of the rotor. Additionally, the power source can include a nozzle that directs the pressurized fluid at the impeller.

In one embodiment, the power source includes a control system that receives the generated electricity. For example, the control system can electronically control the amount of effort required to rotate the rotor by dynamically adjusting the level of at least one of an output voltage, an output current and a rotor rotation speed.

The power source provided herein can be manually powered, for example, by being hand-cranked or stepped-on by the user. In one embodiment, the power source enables charging of electronic devices in the field while controlling the output voltage and current and maintaining specified input torque drag versus cranking or stepping speeds.

The present invention is also directed to a method for manually generating electrical power.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6 is a perspective view of a portion of another embodiment of a generator assembly having features of the present invention;

FIG. 7 is a perspective view of another embodiment of a fluid source having features of the present invention.

DESCRIPTION

Figure 1:
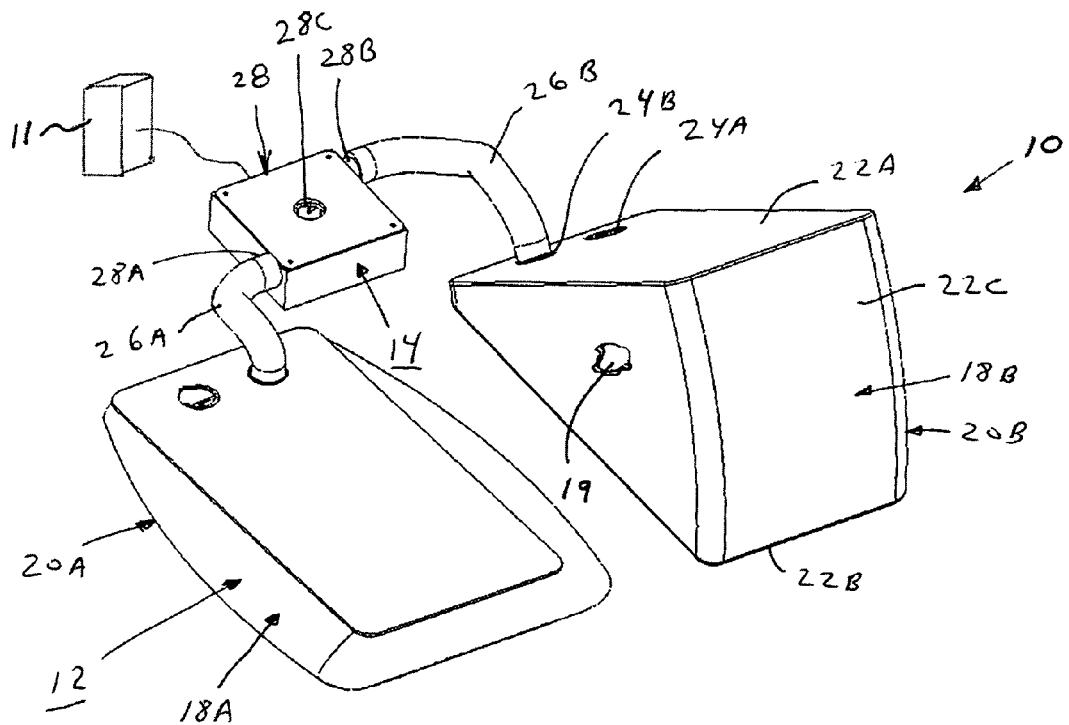
FIG. 1 is a simplified perspective view, in partial cut-away of one embodiment of the power source having features of the present invention.

FIG. 1 is a perspective view of a first embodiment of a power source 10 that generates electrical power, and an electronic device 11 or object that is electrically connected to the power source 10 and that can be charged with the power source 10. The power source 10 can be used as a manually powered, mobile and portable generator. As used herein, the term "manually powered" shall mean employing human instead of mechanical energy to power the power source 10. In certain embodiments, the power source 10 is a lightweight, efficient portable power source. Alternatively, for example, the power source 10 can be designed as a stationary generator 10.

As an overview, in certain embodiments, power source 10 uses the human input motions to compress a chamber of fluid, like air or liquid. Subsequently, pressurized fluid from the chamber is used to turn a dynamo rotor at high speed.

The type of electronic device 11 charged by the power source 10 can vary. For example, the electronic device 11 can be portable and can include (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Alternatively, the electronic device can be stationary. In the embodiment illustrated in FIG. 1, the power source 10 can be operated independently of the particular electronic device 11 being charged.

The design of the power source 10 can vary pursuant to the teachings provided herein. In one embodiment, the power source 10 includes a fluid source 12, and a generator assembly 14. The design of each of these components can vary pursuant to the teachings provided herein. In FIG. 1, the fluid source 12 and the generator assembly 14 are illustrated as separate, spaced apart units. Alternatively, the power source 10 can be design so that these components are integrated together into the same housing.

The fluid source 12 generates pressurized fluid 16 (illustrated as arrows in FIG. 3B) that is transferred to the generator assembly 14. In the embodiment illustrated in FIG. 1, the fluid source 12 includes a first fluid pump 18A, and a second fluid pump 18B that can be individually and manually manipulated to generate the pressurized fluid 16. For example, the fluid pumps 18A, 18B can be a foot-operated pump. In this embodiment, the fluid pumps 18A, 18B are adapted to be engaged by the feet of the user. Alternatively, for example, the fluid source 12 can include a single fluid pump, and/or one or both of the fluid pumps 18A, 18B can be engaged by the hands of the user.

In one embodiment, each of the fluid pumps 18A, 18B is a bellows type pump that defines a chamber 19 (exposed by a partial cut-away in the second fluid pump 18B) that is compressed by pushing, e.g. stepping on the respective fluid pump 18A, 18B. In FIG. 1, the left side, first fluid pump 18A is illustrated in a down or compressed position 20A with most of the fluid, e.g. air expelled from the chamber. The right side, second fluid pump 18B is illustrated in an up or uncompressed position 20B with most of the fluid, e.g. air in the chamber.

In FIG. 1, each of the fluid pump 18A, 18B includes (i) a generally rigid, flat plate shaped pedal 22A, (i) a generally rigid, flat plate shaped base 22B, and (iii) a flexible bellowed side 22C that connects and seals the pedal 22A to the base 22A, and allows the pedal 22A to move relative to the base 22B. In FIG. 1, a portion of the bellowed side 22C of the second fluid pump 18B is cut-away to expose the chamber 19.

In FIG. 1, the pedals 22A are designed to be engaged by the feet of the user. The base 22B engages the floor and provides stability. Suitable materials for the pedal 22A and base 22B include a hard plastic or other lightweight rigid material. The bellowed side 22C is a made of a flexible, airtight fabric or material. Suitable materials for the bellowed side 22C includes coated nylon, and rubber-impregnated fabrics.

In FIG. 1, each fluid pump 18A, 18B is generally triangular shaped in the uncompressed position 20B and is somewhat flattened in the compressed position 20A. However, one or both of the fluid pumps 18A, 18B can have another configuration of design.

Additionally, in FIG. 1, each fluid pump 18A, 18B includes one or more fluid inlets 24A and one or more fluid outlets 24B. The fluid inlet 24A allows for the flow of fluid into each fluid pump 18A, 18B, and the fluid outlet 24B allows for pressurized fluid to flow from each fluid pump 18A, 18B. In FIG. 1, the fluid inlet 24A and the fluid outlet 24B is a port through the respective pedal 22A. Alternatively, the inlet 24A and/or the outlet 24B can be positioned at another location.

In one embodiment, each of the fluid inlets 24A includes a one-way intake valve 25 (illustrated in FIG. 2B) that allows the fluid to enter the chamber as the pedal 22A is raised to the uncompressed position 20B. As the pedals 22A are stepped on, the fluid inside the chamber is compressed, and the intake valve closes and prevents the fluid from escaping the intake valve.

In FIG. 1, the pedals 22A are designed to move up in down in alternating fashion and the downward stroke of the foot is the power stroke. Alternatively, for example, the pedals 22A can be designed to spin in a bicycle type style.

The pressurized fluid 16 from the chamber 19 is expelled from the fluid outlets 24B. In FIG. 1, the power source 10 includes a first conduit 26A, e.g. a flexible hose, that connects the fluid outlet 24B of the first fluid pump 18A to the generator assembly 14, and a second conduit 26B, e.g. a flexible hose, that connects the fluid outlet 24B of the second fluid pump 18B to the generator assembly 14.

In one embodiment, each of the fluid outlets 24B includes a one-way exit valve 27 (illustrated in FIG. 2B) that inhibits fluid from the respective conduit 26A, 26B from reversing direction and flowing into the bellows chamber 19.

Figure 2A:
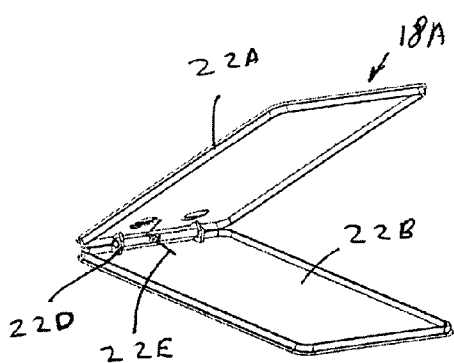
FIG. 2A is a simplified perspective view of a portion of the power source of FIG. 1.

Referring to FIG. 2A, the pedal 22A and the base 22B of one of the fluid pumps 18A is illustrated. In this embodiment, the fluid pump 18A also includes a hinge 22D that pivotable connects the pedal 22A to the base 22B and a spring 22E that is designed to forcefully urge the pedal 22A away from the base 22B, working against the downward stepping forces. A downward step pushes the pedal 22A down and winds up the spring 22E. The spring 22E forcefully returns the pedal 22A to the up position as the foot pressure is removed.

Figure 2B:
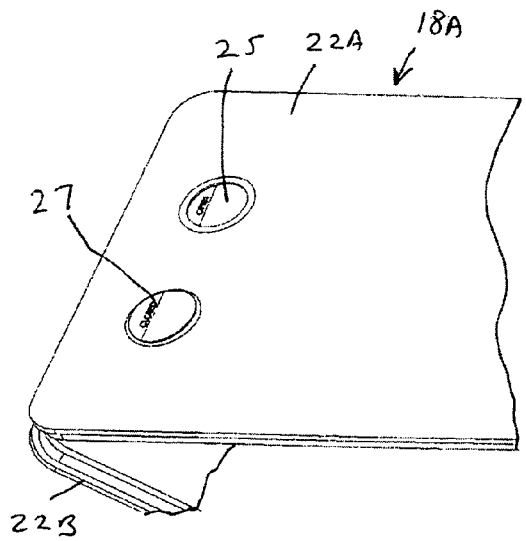
FIG. 2B is a simplified perspective view of a portion of the power source of FIG. 1.

FIG. 2B illustrates a portion of the pedal 22A, a portion of the base 22B, the intake valve 25, and the exit valve 27 of one of the fluid pumps 18A.

Referring back to FIG. 1, the generator assembly 14 is connected in fluid communication with the fluid source 12. In this embodiment, the generator assembly 14 includes a rigid generator housing 28. In FIG. 1, the generator housing 28 is generally rectangular shaped and includes (i) a first generator inlet 28A that is in fluid communication with the fluid outlet 24B of the first fluid pump 18A via the first conduit 26A, (ii) a second generator inlet 28B that is in fluid communication with the fluid outlet 24B of the second fluid pump 18B via the second conduit 26B, and (iii) a generator outlet 28C that is open to the surrounding environment. Alternatively, the generator assembly 14 could be design with a different number of generator inlets and/or outlets than that illustrated in FIG. 1.

In FIG. 1, the system is an "open" system. More specifically, in this embodiment, air from the environment is ingested into the fluid pumps 18A, 18B via the fluid inlets 24A. Subsequently, pressurized air 16 from the fluid pumps 18A, 18B is directed into the generator housing 28 via the generator inlets 28A, 28B. The pressurized air causes movement of a portion of the generator assembly 14 as described below. Next, the air is expelled back to the environment through the generator outlet 28C.

Alternatively, a "closed" system could also be employed where expelled fluid from the generator outlet 28C could be directed/transferred with one or more conduits back to the fluid inlets 24A of the fluid pumps 18A, 18B. In this fashion, the same fluid would circulate back and forth from the fluid pumps 18A, 18B through the generator assembly 14, and back again to the fluid pumps 18A, 18B. A closed system might be advantageous if the fluid used was not simply atmospheric pressure air. Such might be the case with a liquid fluid like water, or a high pressure gas like nitrogen. A closed system can inhibit dirt or moisture from the environment from entering the system.

Figure 3A:
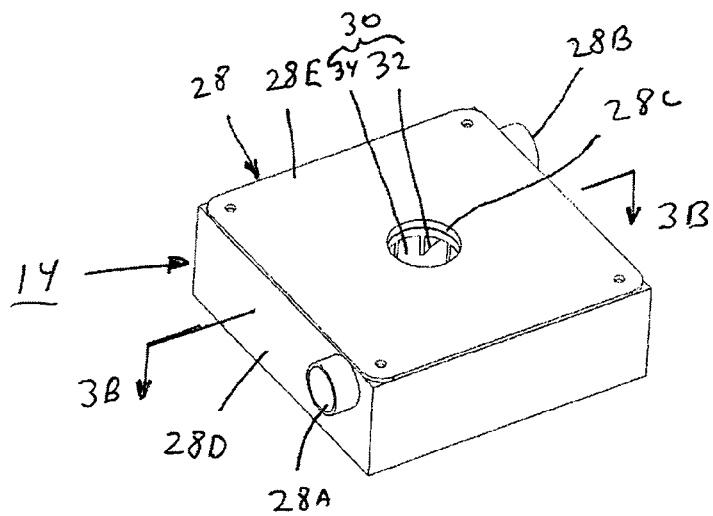
FIG. 3A is a top perspective view of one embodiment of a generator assembly 14 having features of the present invention.

FIG. 3A is a perspective view of the generator assembly 14 including the generator housing 28, the first generator inlet 28A, the second generator inlet 28B, and the generator outlet 28C. In this embodiment the generator housing 28 is generally rectangular box shaped and encloses many of the components of the generator assembly 14. Further, in this embodiment, the generator housing 28 includes four sides 28D and a removable top 28E. A suitable material for the generator housing 28 is plastic.

Figure 3B:
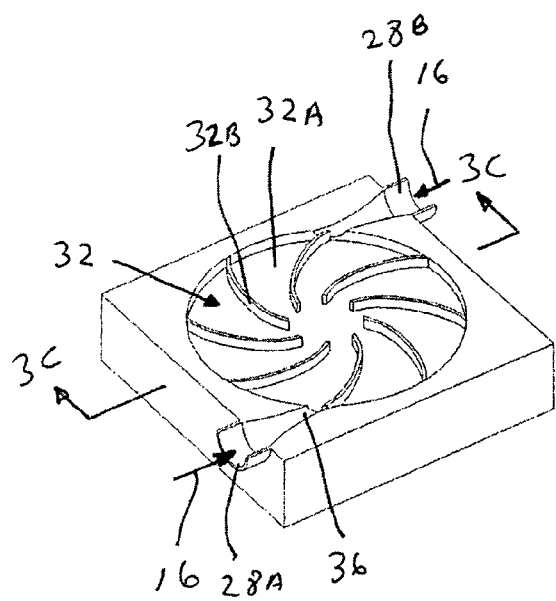
FIG. 3B is a cut-away view taken on line 3B-3B in FIG. 3A.
Figure 3C:
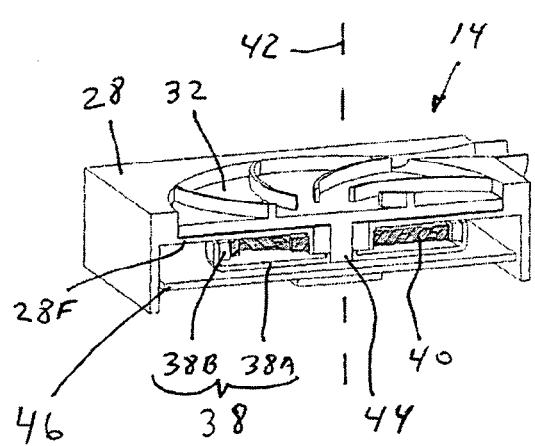
FIG. 3C is a cut-away view taken on line 3C-3C in FIG. 3B.

FIG. 3A illustrates that the generator assembly 14 also includes a fluid driven motor 30 that receives the pressurized fluid 16 and causes movement of a rotor 38 (illustrated in FIG. 3C). In one embodiment, the fluid driven motor 30 includes a radial impeller 32 positioned in an impeller chamber 34 of the generator housing 28. The pressurized fluid 16 (illustrated in FIG. 3B) directed at the impeller 32 produces rotation of the impeller 32. Alternatively, other types of fluid driven motors 30 that produce rotation from input fluid streams can be utilized. For example, the fluid driven motor 30 can include an axial impeller, a turbine, or a piston type engine, or other fluid-driven motor types known to the art (scroll expanders).

FIG. 3B is a cut-away view of the generator assembly 14 that illustrates the impeller 32 in more detail. The design of the impeller 32 can vary. In FIG. 3B, the impeller 32 is a radial inflow impeller that includes a disk shaped impeller base 32A, a plurality of curved impeller blades 32B that extend upward from the impeller base 32A, and a dish shaped impeller top 32C (illustrated in FIG. 3E positioned on top of the impeller blades 32B. A suitable material for the impeller 32 is plastic.

FIG. 3B also illustrates that the first generator inlet 28A and the second generator inlet 28B are each tapered to form a nozzle 36 that directs the pressurized fluid 16 at the impeller blades 32B to rotate the impeller 32. The nozzle 36 increases the speed of the incoming pressurized fluid 16. In one embodiment, the nozzles 36 are oriented to direct the incoming pressurized fluid 16 tangentially, and radially against the impeller blades 32B to optimize the torque on the impeller blades 32B. The pressurized fluid 16 spins the impeller 32 and moves radially inward, finally exiting the generator unit through the generator outlet 28B (illustrated in FIG. 3A), e.g. a hole on the center axis of the unit.

In one embodiment, both of the fluid pumps 18A, 18B (illustrated in FIG. 1) direct pressurized fluid 16 into the same fluid driven motor 30. For example, with a step type system, the fluid pumps 18A, 18B can direct pressurized fluid 16 at different locations at the same impeller 32 at approximately alternating times.

FIG. 3C is a cut-away view of a portion of the generator assembly 14 that illustrates some of the other components of the generator assembly 14 in more detail. For example, FIG. 3C illustrates that the generator assembly 14 includes a rotor 38 and a stator 40. Collectively, the rotor 38 and stator 40 are sometimes referred to as a BLDC generator. The rotor 38 and the stator 40 cooperate to convert mechanical energy from the rotation of the rotor 38 to electrical energy. The design of these components can be varied to achieve the desired design requirements of the generator assembly 14.

In FIG. 3C, the rotor 38 rotates with the impeller 32 about a rotational axis 42. In one embodiment, the rotor 38 includes a somewhat cup shaped rotor frame 38A, and a generally annular ring shaped magnet array 38B. The rotor frame 38A can be made of steel to provide a return path for magnetic fields from the magnet array 38B. The magnet array 38B can include a plurality of arc shaped magnets.

The stator 40 is fixedly secured to the generator housing 28. In FIG. 3C, the stator 40 is somewhat spoked wheel shaped with a plurality of slots, and is substantially encircled by the rotor 38. The stator 40 includes one or more turns of wire. The multiple turns of wire can be made of copper or another electrically conductive material that is embedded in an epoxy or another type of adhesive, the purpose of which is to reduce acoustic noise and improve thermal heat dissipation.

In an alternative embodiment of the present invention, the positions of the rotor 38 and the stator 40 can be reversed. Still alternatively, the rotor 38 can include one or more turns of wire and the stator 40 can include one or more magnets.

In FIG. 3C, the impeller 32 directly drives the rotor 38. In this embodiment, a rigid shaft 44 fixedly connects the rotor 38 to the impeller 32. Further, a bearing secures the shaft 44, the impeller 32, and the rotor 38 to the generator housing 28 and allows these components to rotate relative to the generator housing 28. For example, the bearing can be a ball bearing or a journal type bearing.

FIG. 3C also illustrates that the generator housing 28 can include an intermediate wall 28F that separates the impeller 32 from the rotor 38 and stator 40.

Additionally, FIG. 3C illustrates that the generator assembly 14 can include a printed circuit board 46 positioned below the rotor 38.

Figure 3D:
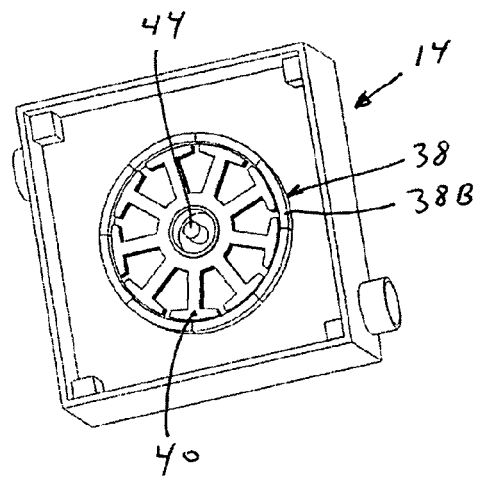
FIG. 3D is a perspective view of a portion of the generator assembly of FIG. 3A.

FIG. 3D is a bottom perspective view of the generator assembly 14 without the printed circuit board 46 and without the rotor frame 38A of the rotor 38. FIG. 3D illustrates the shaft 44, the magnet array 38B and the stator 40 in more detail.

Figure 3E:
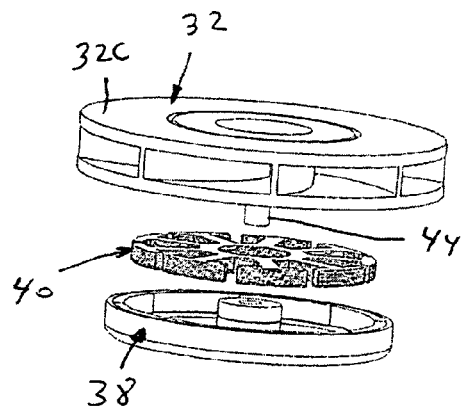
FIG. 3E is an exploded perspective view of a portion of the generator assembly of FIG. 3A.

FIG. 3E is an exploded perspective view of the impeller 32, the rotor 38, the stator 40, and the shaft 44.

Figure 3F:
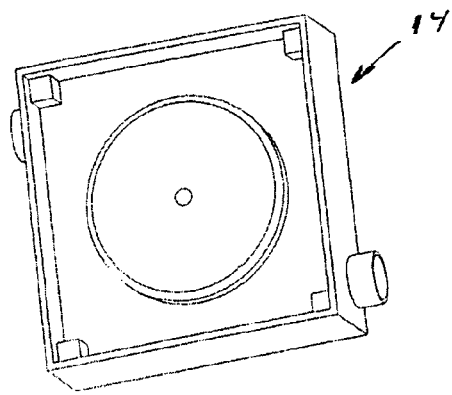
FIG. 3F is a perspective view of a portion of the generator assembly of FIG. 3A.

FIG. 3F is a bottom perspective view of the generator assembly 14 without the printed circuit board 46.

Figure 3G:
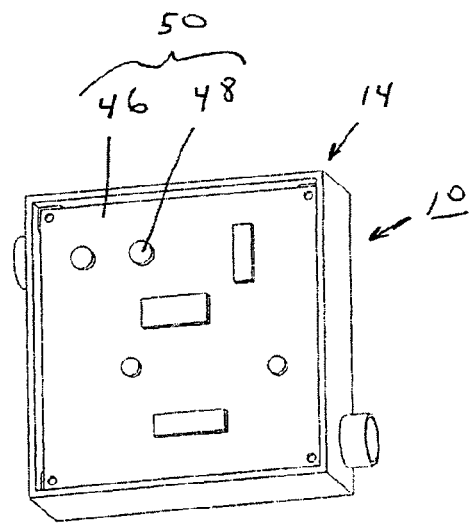
FIG. 3G is a perspective view of a portion of the generator assembly of FIG. 3A.

FIG. 3G is a bottom perspective view of the generator assembly 14 including the printed circuit board 46. In one embodiment, the printed circuit retains and electrically connects a plurality of electrical component 48 to form a control system 50 that controls one or more functions of generator assembly 14 and/or the charging of the electronic device 11 (illustrated in FIG. 1). For example, the control system 50 can monitor the input and output parameters of the power source 10 and provide visual feedback (via one or more displays) to the user as to the progress of the power generation process. Further, the control system 50 can perform one or more of the features of (i) automatic detection of the load voltage required to charge the electronic device 11, (ii) allow for the hookup of multiple power sources 10 to charge the electronic device 11, (iii) detect and configure to charge various custom battery types, (iv) dynamically adjust the output voltage, (v) dynamically adjust the output current, (vi) dynamically control a rotational velocity of the rotor component, and/or (vii) adjusting the amount of torque required to rotate the rotor 38.

In one embodiment, the control system 50 receives the generated electricity from the stator 40 (illustrated in FIG. 3E) and electronically controls the amount of effort required to rotate the rotor 38 (illustrated in FIG. 3E) by dynamically adjusting the level of at least one of an output voltage, an output current and a rotor rotation speed. Further, the control system 50 precisely controls the electrical power output 415.

In one embodiment, the control system 50 rectifies the dynamo electrical power, controls rotor speed and user felt resistance, and controls voltages and currents to the device being charged. In certain embodiments, the control system 50 also monitors progress, prevents overcharging to the device under charge, and even allows an auxiliary power input if electrical power from another source besides the dynamo is available.

Figure 4:
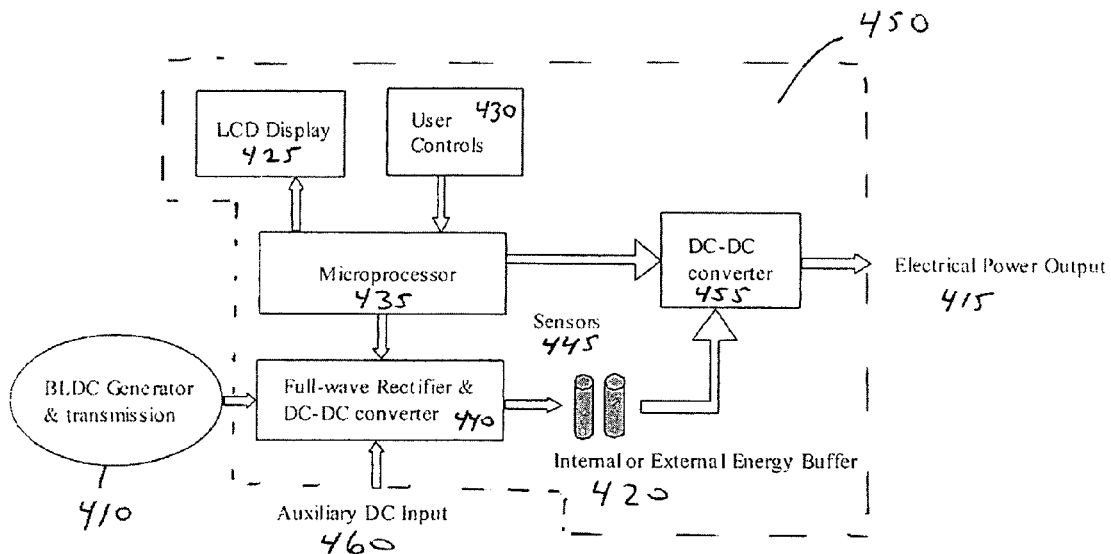
FIG. 4 is a block diagram of a power source having features of the present invention.

FIG. 4 is a block diagram of power generator system having features of the present invention that utilizes electrical energy from a generator (rotor/stator) 410 and controls it via a control system 450 (illustrated with a dashed line) that regulates the output voltages, currents supplied to an external device being charged, such as a rechargeable battery. By accepting more or less energy from the input generator, it can vary the amount of effort the user must expend in turning the rotor. This circuitry is discussed in more detail in U.S. Pat. Nos. 7,049,708; 6,943,459; 6,930,403; and 6,849,960, the contents of which is incorporated herein by reference.

FIG. 4 illustrates that the control system 450 can include an internal or external energy buffer 420 that is used when the input power surges above what the electrical device 11 being charged can safely absorb. This can be an internal or external battery, such as a high charge rate battery such as a Li-ion battery produced by A123systems of Massachusetts. During stepping motions, there is often a surge of power during the down step motion, and a drop off of power during the up motion interval. The buffer evens out this power flow. The buffer is used in cases where the device being charged cannot accept power at the high power rates that the user produces it. The buffer absorbs the high energy levels, while a second control system takes energy from the buffer at a different, typically lower rate and converts it to that required by the device under charge.

Additionally, FIG. 4 illustrates that the control system 450 can include (i) a display 425, e.g. a LCD display, that displays charging or other relevant information, (ii) user controls 430 that allows the user to interact with the control system 450, (iii) a microprocessor 435, (iv) a full-wave rectifier and DC-DC converter 440, (v) one or more sensors 445, and (vi) a DC-DC converter 455.

Further, FIG. 4 illustrates that the control system 450 can receive electrical power input from an auxiliary DC input 460 such as another manual generator or other power source.

Figure 5:
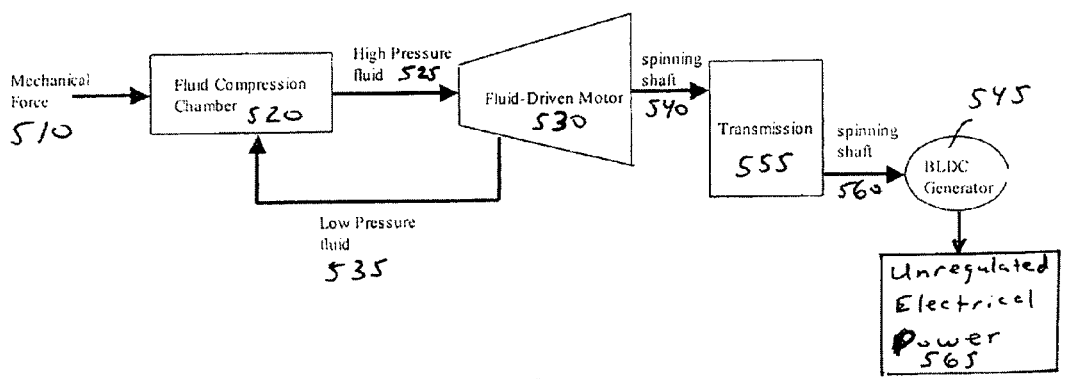
FIG. 5 is a block diagram of the mechanical transmission assembly and BLDC dynamo generator.

FIG. 5 shows a simplified block diagram that illustrates how one embodiment of the power source functions. In this embodiment, mechanical force 510 is used to compress a fluid in a fluid compression chamber 520. The high pressure fluid 525 is expanded to produce shaft rotation in a fluid-driven motor 530. Optionally, the low pressure exited fluid 535 can be returned back to the compression chamber in a "closed" system. Alternatively, if using air, the low pressure exiting fluid can just be vented to the atmosphere. The fluid-driven motor shaft rotation 540 is then used to turn the rotor of a BLDC generator 545. The generation can be rigidly fixed to the spinning motor shaft as shown in FIG. 3C, or can be driven via a transmission 555 (as illustrate in FIG. 6) having a transmission output 560, e.g. a shaft 560. Finally, the rotating BLDC generator 545 causes varying magnetic fields in the stator wires that produces unregulated output electrical power 565. The unregulated output electrical power 565 is transferred to the control system (not shown in FIG. 5) for rectification and voltage and current control.

FIG. 6 is a simplified perspective view, in partial cut-away, of a portion of another embodiment of a power source 610. In this embodiment, the impeller 632 is mechanically coupled to the rotor 638 with a transmission assembly 652. For example, the transmission assembly 652 can include an impeller gear 652A that is fixed to the impeller 632 and a rotor gear 652B that is fixed to the rotor 638 and that meshes with the impeller gear 652A. For example, the impeller gear 652A can be relatively large and the rotor gear 652B can be relatively small to gear up the rotor 638. With this design, the rotor 638 rotates faster than the impeller 632. Alternatively, the gear sizes can be switched so that the rotor 638 is geared down.

In this embodiment, the impeller 632 drives the rotor 638 through an intermediate gear transmission 652. An intermediate transmission 652 may be desired if the optimal speed for the rotor 638 is faster or slower than the operating speed of the impeller 632. A step-up or step-down transmission 652 could be used.

Alternatively, the transmission assembly 652 can have a design that is different than that illustrated in FIG. 6. For example, the transmission assembly 652 can include belts, pulleys, or other types of transmissions.

FIG. 7 is a simplified perspective view of another embodiment of a fluid source 712. In this embodiment, the fluid source 712 again includes a first fluid pump 718A and a second fluid pump 718B. However, in this embodiment, each of the fluid pumps 718A, 718A is a piston type pump that is manually actuated to generate the pressurized fluid (not shown in FIG. 7). In FIG. 7, each of the fluid pumps 718A, 718B includes (i) a cylinder 760 that contains a fluid, (ii) a piston 762 (illustrated in phantom) that moves within the cylinder 760, and (iii) a piston mover 764 that is coupled to the piston 762. With this design, manual movement of the piston mover 764 by the user results in movement of the piston 762 relative to the cylinder and the generation of pressurized fluid (not shown in FIG. 7). The pressurized fluid is used to rotate a generator as described above. Alternatively, the power source could be designed to be manually driven with a crank assembly.

Figure 8:
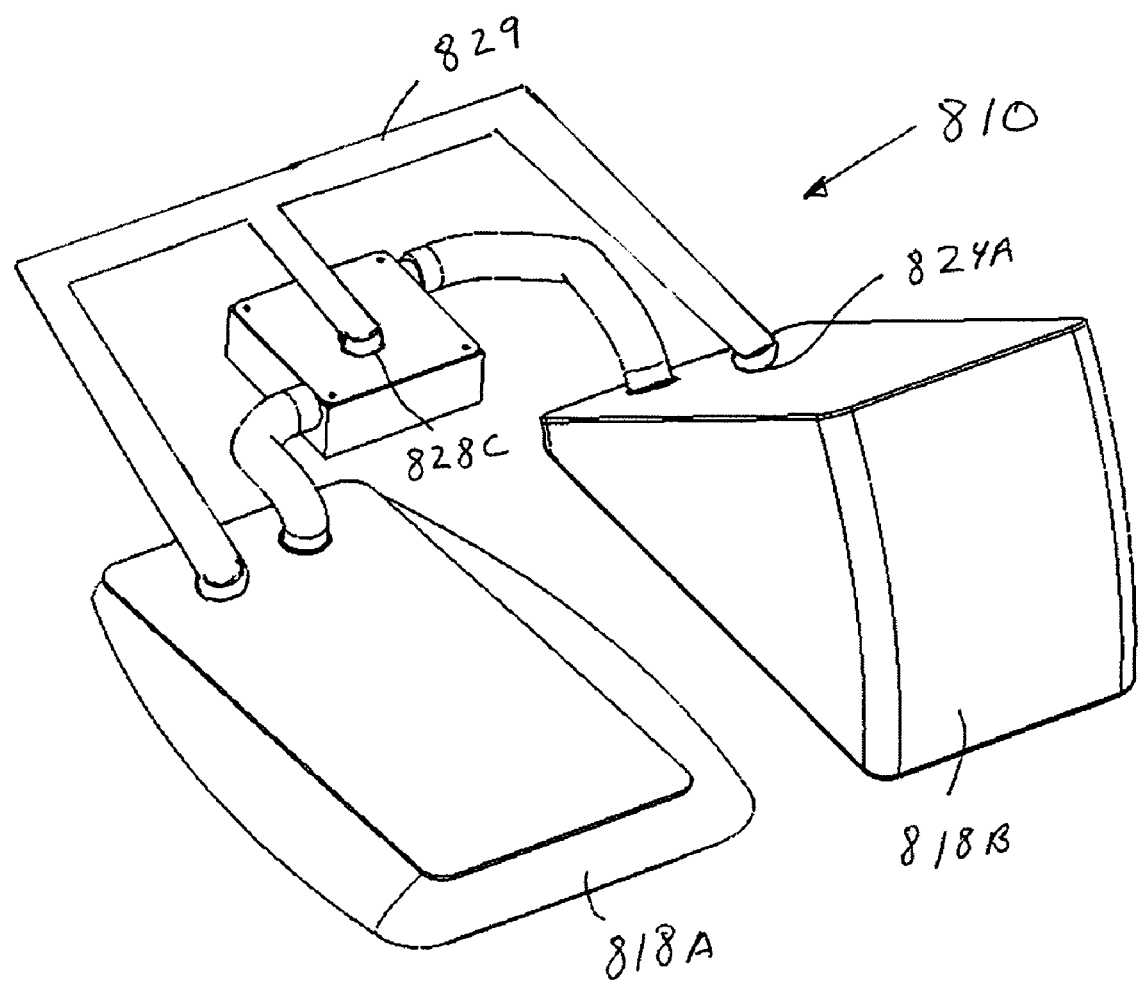
FIG. 8 is a simplified perspective view of another embodiment of the power source having features of the present invention.

FIG. 8 illustrates another embodiment of the power source 810. In this embodiment, the power source 810 is a "closed" system where expelled fluid from the generator outlet 828C is directed with one or more conduits 829 back to the fluid inlets 824A of the fluid pumps 818A, 818B.

The historical means for obtaining rotor rotation from human input power has been to use gears or belt drive speed-increasing transmissions. This is because the speed of human input motions is too low compared to the speeds needed by dynamos to produce their highest levels of electrical power. Humans typically have stepping speeds or cranking speeds of 2-3 cycles per second. However, dynamos prefer to operate at much higher speeds like 25-100 cycles per second. In the case of stepping actions, the full weight of the user is applied to the mechanics, 200 or more pounds. Transmissions capable of supporting these high forces are usually made of heavy metal parts.

In certain embodiments, the present invention uses the human input motions to compress a chamber of fluid, like air or liquid, and use this pressurized fluid to turn the dynamo rotor at high speed. With a bellows type fluid pump having just 100 square inches of stepping area, a 300 pound vertical load can be supported by as little as 3 pounds per square inch (PSI) of air pressure. At this low air pressure, air behaves as an incompressible fluid. This pressurized air can be driven through a narrow nozzle to achieve air speeds over 70-100 miles per hour. This jet of air is directed at the blades of an impeller to achieve impeller speeds of over 100 revolutions per second in a very simple construction. The advantages of this approach are that the fluid pressures produced by human operation are relatively low. These low pressures result in very low stresses on the mechanical parts. Simple, light-weight, inexpensive plastic parts can be used in construction of the mechanics instead of steel. There are no high stresses requiring extensive use of high strength metal parts. And yet, extremely high shaft speeds can be obtained, which is ideal for the dynamo generators.

In one embodiment, the control system controls the amount of torque required to rotate the rotor or depress the foot pedals of the fluid sources. For example, the amount of torque required to rotate the rotor can be varied according to the position of the fluid sources. In addition, the overall drag level can be set via user control so that a weaker person can select a lighter setting than a very strong person. In this fashion, drag levels can span a typical range of 200 to 500 percent from minimum to maximum level.

As provided herein, the crank torque or step resistance can decrease as the angular velocity of the rotor decreases and the crank torque or step resistance increases as the angular velocity increases. This torque versus speed relationship can be completely specified with the control system.

In addition to stepping motions, it is also possible to use hand pressing or cranking motions to pressure cylinders of fluid (liquid or gas). These can be smaller portable power units, still making use of the inventions here disclosed.

While the particular power sources disclosed herein are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A power source for use by a user to generate electrical energy, the power source comprising:
   a generator assembly include a rotor, a stator, and a fluid driven motor that is coupled to the rotor, wherein movement of the rotor relative to the stator results in the generation of electrical energy; and
   a fluid source that is powered by the user, the fluid source directing pressurized fluid to the fluid driven motor to move the rotor relative to the stator, wherein the fluid source includes a second fluid pump that is powered by the user to generate the pressurized fluid, wherein both the first fluid pump and the second fluid pump direct pressurized fluid into the same fluid driven motor.

2. The power source of claim 1 wherein the fluid source includes a first fluid pump that is powered by the user to generate the pressurized fluid.

3. The power source of claim 2 wherein the first fluid pump includes a fluid bellows that is powered by the user to generate the pressurized fluid.

4. The power source of claim 2 wherein the first fluid pump includes a cylinder, and a piston that is moved within the cylinder by the user to generate the pressurized fluid.

5. The power source of claim 1 wherein the fluid driven motor includes an impeller that is rotated by the pressurized fluid.

6. The power source of claim 5 wherein the impeller is directly connected to the rotor so that rotation of the impeller results in rotation of the rotor.

7. The power source of claim 5 further comprising a transmission assembly that connects the impeller to the rotor so that rotation of the impeller results in rotation of the rotor.

8. The power source of claim 5 further a nozzle that directs the pressurized fluid at the impeller.

9. The power source of claim 1 further comprising a control system that receives the generated electricity, wherein the control system electronically controls the amount of effort required to rotate the rotor by dynamically adjusting the level of at least one of an output voltage, an output current and a rotor rotation speed.

10. A power source for use by a user to generate electrical energy, the power source comprising:

a generator assembly include a rotor, a stator, and a fluid driven motor that is coupled to the rotor, wherein rotation of the rotor relative to the stator results in the generation of electrical energy; and a fluid source that is powered by the user, the fluid source including a first fluid pump that directs pressurized fluid to the fluid driven motor to rotate the rotor relative to the stator, and a second fluid pump that directs pressurized fluid to the fluid driven motor to rotate the rotor relative to the stator.

11. The power source of claim 10 wherein the first fluid pump includes a fluid bellows that is powered by the user to generate the pressurized fluid.

12. The power source of claim 10 wherein the first fluid pump includes a cylinder and a piston that is moved within the cylinder by the user to generate the pressurized fluid.

13. The power source of claim 10 wherein the fluid driven motor includes an impeller that is rotated by the pressurized fluid.

14. The power source of claim 10 wherein the fluid driven motor includes a radial impeller that is rotated by the pressurized fluid from both of the fluid sources that is radially directed at the radial impeller.

15. The power source of claim 13 wherein the impeller is directly connected to the rotor so that rotation of the impeller results in rotation of the rotor.

16. The power source of claim 13 further comprising a transmission assembly that connects the impeller to the rotor so that rotation of the impeller results in rotation of the rotor.

17. The power source of claim 13 further comprising a nozzle that directs the pressurized fluid at the impeller.

18. The power source of claim 10 further comprising a control system that receives the generated electricity, wherein the control system electronically controls the amount of effort required to rotate the rotor by dynamically adjusting the level of at least one of an output voltage, an output current and a rotor rotation speed.

19. The power source of claim 10 wherein at least one of the fluid pumps includes a fluid outlet that is in fluid communication with a generator inlet of the generator assembly and wherein at least one of the fluid pumps includes a fluid inlet that is in fluid communication with a generator outlet of the generator assembly.

20. The power source of claim 10 wherein each of the fluid pumps includes a fluid outlet that is in fluid communication with a generator inlet of the generator assembly and wherein each of the fluid pumps includes a fluid inlet that is in fluid communication with a generator outlet of the generator assembly.

21. A method for generating electrical energy, the method comprising the steps of:

providing a generator assembly that includes a rotor, a stator, and a fluid driven motor that is coupled to the rotor, wherein movement of the rotor relative to the stator results in the generation of electrical energy; and manually powering a fluid source that directs pressurized fluid to the fluid driven motor to move the rotor relative to the stator, wherein the step of manually lowering includes the step of manually lowering a first fluid pump to generate the pressurized fluid and manually lowering a second fluid pump to generate the pressurized fluid.

* * * * *